(12) United States Patent
Herley et al.

(10) Patent No.: US 8,825,728 B2
(45) Date of Patent: Sep. 2, 2014

(54) ENTERING CONFIDENTIAL INFORMATION ON AN UNTRUSTED MACHINE

(75) Inventors: Cormac E. Herley, Bellevue, WA (US); Dinei A. Florencio, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1346 days.

(21) Appl. No.: 11/453,626

(22) Filed: Jun. 15, 2006

(65) Prior Publication Data

US 2008/0005340 A1    Jan. 3, 2008

(51) Int. Cl.
- *G06F 7/76* (2006.01)
- *G06F 7/06* (2006.01)
- *H04L 9/20* (2006.01)
- *G06F 7/58* (2006.01)
- *G06F 7/02* (2006.01)
- *H04L 29/06* (2006.01)

(52) U.S. Cl.
CPC ............. *H04L 63/145* (2013.01); *H04L 63/083* (2013.01)
USPC ............... 708/250; 380/30; 380/46; 340/365; 713/202

(58) Field of Classification Search
CPC ............. H04L 9/06; H04L 19/30; G06F 7/06; G06F 7/76; G06F 7/58
USPC ........................................ 709/229; 713/202
See application file for complete search history.

(56) References Cited

U.S. PATENT DOCUMENTS

| | | | | |
|---|---|---|---|---|
| 4,479,112 A | * | 10/1984 | Hirsch | 380/52 |
| 5,664,099 A | * | 9/1997 | Ozzie et al. | 726/29 |
| 5,751,812 A | | 5/1998 | Anderson | 380/48 |
| 5,781,550 A | | 7/1998 | Templin et al. | 370/401 |
| 6,011,910 A | * | 1/2000 | Chau et al. | 709/229 |
| 6,104,716 A | | 8/2000 | Crichton et al. | 370/401 |
| 6,173,402 B1 | * | 1/2001 | Chapman | 713/182 |
| 6,202,156 B1 | * | 3/2001 | Kalajan | 726/11 |
| 6,904,415 B2 | * | 6/2005 | Krahn et al. | 705/50 |
| 6,944,181 B2 | * | 9/2005 | Inoue et al. | 370/465 |
| 7,188,086 B2 | * | 3/2007 | Shinzaki et al. | 705/51 |
| 7,357,312 B2 | * | 4/2008 | Gangi | 235/380 |
| 7,366,753 B2 | * | 4/2008 | Miyake | 709/203 |

(Continued)

FOREIGN PATENT DOCUMENTS

| | | |
|---|---|---|
| CN | 1694396 A | 11/2005 |
| CN | 1719370 A | 1/2006 |

(Continued)

OTHER PUBLICATIONS

Official Search Report of the European Patent Office in counterpart foreign application No. PCT/US2007/010431 filed Apr. 30, 2007.

(Continued)

*Primary Examiner* — Melanie Jagannathan
*Assistant Examiner* — Jason Harley
(74) *Attorney, Agent, or Firm* — Steve Wight; Carole Boelitz; Micky Minhas

(57) ABSTRACT

Confidential information is provided to a proxy computer in communication between an unsecured computer and a computer having information desired by a user. The proxy computer receives the confidential information in either an encrypted form or having arbitrary information combined therewith. The proxy computer ascertains the confidential information and forwards it to the computer having the information desired by the user.

20 Claims, 10 Drawing Sheets

(56) References Cited

U.S. PATENT DOCUMENTS

| | | | |
|---|---|---|---|
| 2002/0066039 A1* | 5/2002 | Dent | 713/202 |
| 2002/0129269 A1* | 9/2002 | Cheol-Shin et al. | 713/200 |
| 2003/0028650 A1 | 2/2003 | Chen et al. | 716/5 |
| 2003/0163737 A1 | 8/2003 | Roskind | 713/168 |
| 2003/0200321 A1 | 10/2003 | Chen et al. | 709/229 |
| 2004/0024850 A1* | 2/2004 | Miyake | 709/219 |
| 2004/0078568 A1* | 4/2004 | Pham et al. | 713/165 |
| 2004/0090930 A1* | 5/2004 | Lee et al. | 370/328 |
| 2004/0117364 A1* | 6/2004 | Kobayashi et al. | 707/3 |
| 2004/0117493 A1 | 6/2004 | Bazot et al. | 709/229 |
| 2004/0139351 A1 | 7/2004 | Tsang | 719/322 |
| 2005/0071677 A1 | 3/2005 | Khanna | 713/165 |

FOREIGN PATENT DOCUMENTS

| | | | |
|---|---|---|---|
| EP | 1102157 | 1/2000 | G06F 1/00 |
| EP | 1046976 | 10/2000 | G06F 1/00 |
| EP | 1132847 | 9/2001 | G06F 17/60 |
| JP | 2011161385 A | 8/2011 | |
| KR | 20020041615 A | 6/2002 | |

OTHER PUBLICATIONS

Kaminsky, User Authentication and Remote Execution Across Administrative Domains, Department of Electrical Engineering and Computer Science, Massachusetts Institute of Technology, Jun. 2004.

Michael Kaminsky, Eric Peterson, Kevin Fu, David Mazières, and M. Frans Kaashoek. REX: Secure, modular remote execution through file descriptor passing. *MIT LCS Technical Report (MIT-LCS-TR-884)*, Jan. 2003.

Sixth USENIX Security Symposium, Proceedings of the Sixth USENIX Security Symposium, Jul. 22-25, 1996, pp. 37-42, San Jose, CA.

First Office Action From the People's Republic of China for Application No. 200780022349.3, date of dispatch May 5, 2010.

Chinese Patent Application No. 200780022349.3 "Our Comments and Draft Response" Partial Translation of references from Notice of First Office Action dated May 21, 2010. 3 pages.

Notice of Preliminary Rejection for Korean Patent Application No. 10-2008-7030395 mailed on Dec. 29, 2013, 9 pages.

"Notice of Allowance Received in Korea Patent Application No. 10-2008-7030395", Mailed Date: May 16, 2014, Filed Date: Apr. 30, 2007, 2 Pages. (w/o English Translation).

* cited by examiner

|   | 1 | 2 | 3 | 4 | 5 | 6 | 7 | 8 | 9 | 10 | ... |
|---|---|---|---|---|---|---|---|---|---|----|-----|
| A | r | 5 | s | h | 2 | k | l | s | F | f  | ... |
| B | f | r | F | s | f | J | u | 5 | r | T  | ... |
| C | 7 | ) | 5 | 3 | h | T | k | g | A | i  | ... |
| D | G | 5 | o | P | L | y | z | Z | d | x  | ... |
| ⋮ | ⋮ | ⋮ | ⋮ | ⋮ | ⋮ | ⋮ | ⋮ | ⋮ | ⋮ | ⋮  | ... |

FIG. 7

|   | 0 | 1 | 2 | 3 | 4 | 5 | 6 | 7 | 8 | 9 |
|---|---|---|---|---|---|---|---|---|---|---|
| A | 45 | 15 | 53 | 71 | 2 | 17 | 34 | 37 | 55 | 34 |
| B | 62 | 23 | 25 | 29 | 22 | 31 | 36 | 51 | 39 | 67 |
| C | 73 | 11 | 5 | 13 | 25 | 34 | 44 | 53 | 57 | 66 |
| D | 33 | 45 | 52 | 14 | 29 | 46 | 31 | 36 | 18 | 28 |
| E | 1 | 63 | 46 | 32 | 37 | 27 | 68 | 32 | 53 | 27 |
| F | 63 | 35 | 24 | 67 | 15 | 70 | 31 | 6 | 13 | 8 |
| G | 11 | 10 | 62 | 58 | 24 | 17 | 39 | 37 | 19 | 16 |
| H | 54 | 7 | 29 | 20 | 67 | 3 | 55 | 68 | 28 | 62 |
| I | 66 | 25 | 5 | 21 | 16 | 57 | 36 | 60 | 9 | 34 |
| J | 30 | 69 | 44 | 18 | 65 | 26 | 14 | 18 | 44 | 29 |

ENTERING CONFIDENTIAL INFORMATION ON AN UNTRUSTED MACHINE

BACKGROUND

The discussion below is merely provided for general background information and is not intended to be used as an aid in determining the scope of the claimed subject matter.

The ability to access information has been greatly enhanced with the popularity of the Internet. Now it is quite easy and convenient to use publicly available computers such as those present in libraries, coffee shops, hotels and the like to access a computer at work or home, or access websites having personal information such as banks, brokerages, email services, etc.

Unfortunately, these publicly available computers often contain malicious programs generally known as spyware or keyloggers. Spyware is generally considered any software application that covertly gathers user information without his or her knowledge and permission. Spyware includes a broad range of techniques that snoop on user activity, deploy Trojan downloaders, or infest the computer with adware.

Keyloggers can be considered a specific form of spyware, or monitoring software, in that a keylogger captures the keystrokes or other forms of input of a computer user and stores them. Modern keyloggers can store additional information, such as images of the user's screen as well. Most malicious keyloggers send this data to a third party remotely such as via email, where the recorded information can be analyzed to ascertain personal and often times valuable information such as passwords, credit card numbers, social security numbers and the like.

Either through malice or negligence on the part of the administrators, publicly available computers are particularly vulnerable to spyware and keyloggers. Since the user does not have control of the machine and is often using it for only a short amount of time, the user is unable to verify that the computer is not infected. In such cases, either the user must choose not to use the computer and attempt to find a safer computer, if even available, or enter the confidential information such as the password and hope for the best.

SUMMARY

The Summary and Abstract are provided to introduce a selection of concepts in a simplified form that are further described below in the Detailed Description. The Summary and Abstract are not intended to identify key features or essential features of the claimed subject matter, nor are they intended to be used as an aid in determining the scope of the claimed subject matter. In addition, the claimed subject matter is not limited to implementations that solve any or all disadvantages noted in the background.

Confidential information is provided to a proxy computer in communication between an unsecured computer and a computer having information desired by a user. The proxy computer receives the confidential information in either an encrypted form or having arbitrary information combined therewith. The proxy computer ascertains the confidential information and forwards it to the computer having the information desired by the user.

BRIEF DESCRIPTION OF THE DRAWINGS

FIG. 7 is a pictorial representation of a mapping table.
FIG. 9 is a pictorial representation of a mapping table.

DETAILED DESCRIPTION

Figure 1:
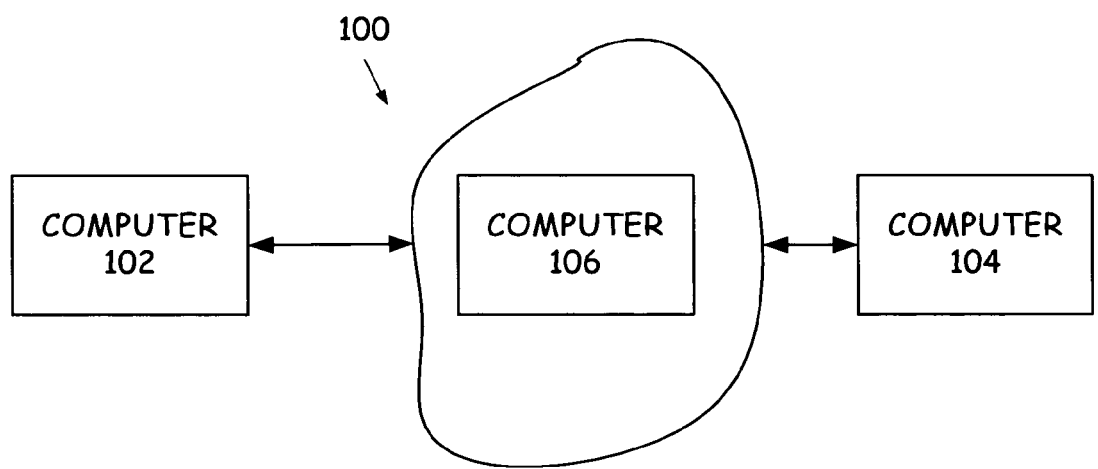
FIG. 1 is a block diagram of a computer system.

FIG. 1 illustrates a computing environment 100 comprising a computer 102 having information desired by a user and an unsecured computer 104 used by the user to access the computer 102. Herein, computer 104 is considered "unsecured" because, when used, it is susceptible to revealing confidential information (for example, a password) that is used by the user to access the information on or via computer 102. For example, computer 104 can be "unsecured" due to its location in that when used by the user someone may be able to view or otherwise detect by observation what the access information is. For instance, someone may be able to view the keyboard and monitor while the user is entering confidential information. In other situations, someone may be able to overhear the confidential information, or portions thereof, when made audibly.

In addition, or in the alternative, computer 104 may be unsecured because it may possibly contain program modules (e.g. keylogging modules) that can detect confidential information and/or record the use of the computer 104 by the user such that the confidential information can be ascertained. Common, although not exclusive, examples include computers that are available for use by the public such as at coffee shops, bars, hotels and the like. Since these computers are not under the control of the user, the user can not be assured that program modules to record or detect confidential information are not present on the computer. However, even if the computer is under the control of the user and precautions have been taken to try to prevent such recording or detection of the confidential information, the user's computer can be considered "unsecured." For example, due to the constant development of program modules to detect or record confidential information, the user may not be assured that his/her computer is secure. Likewise, if the user uses his/her computer to access computer 102 via another's network, such as a wireless network providing access to the Internet, the user's computer can be unsecured. In addition, if the user uses his/her computer in an environment where he or she can be observed, the user's computer can be considered unsecured.

Figure 2:
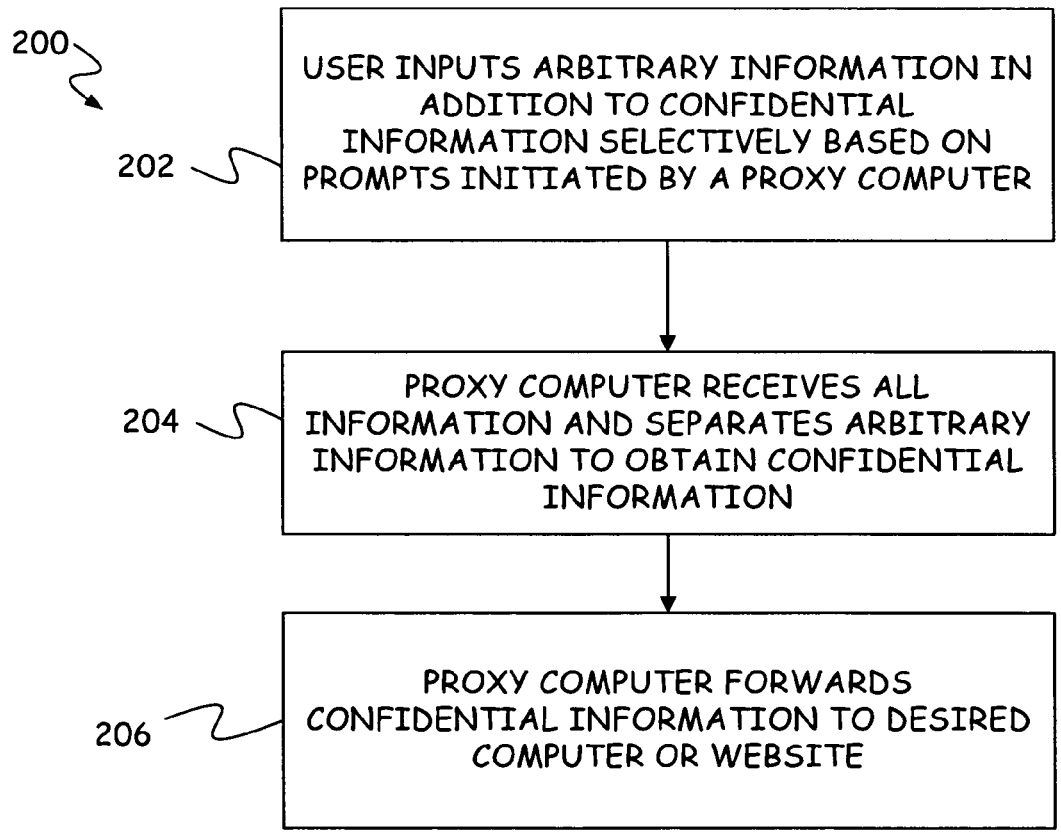
FIG. 2 is a flow chart for entering confidential information.

Connectable to both computer 102 and computer 104 is computer 106. Computer 106 provides a mechanism in which the user of unsecured computer 104 can safely provide the confidential information or other confidential data to computer 102 regardless of whether unsecured computer 104 is being observed or has a keylogger, spyware or similar type of program module installed. Computer 106 can be of the form of a proxy server that is communicatively between unsecured computer 104 and computer 102. Communications intended for computer 102 from unsecured computer 104, and vice versa, are directed to computer 106, which in turn, forwards the communication to the intended computer. However, as illustrated in FIG. 2 in method 200, for selected information in the communications, such as a password, computer 106 causes the user to selectively enter extraneous or arbitrary information in addition to the required input needed at step 202 to form the confidential information. In other words, the user is directed based on prompts so as to alternate at least in part between portions of the confidential information and the arbitrary information. At step 204, computer 106 will receive the arbitrary information in addition to the required input needed to form the confidential information and will process all the information so as to separate the arbitrary information from the confidential information, based on a secret shared between the user and computer 106. At step 206, computer 106 will then forward the confidential information to computer 102. Using by way of example keystrokes on computer 104 that provide a password, the actual password keystrokes will be embedded within a large number of random or at least arbitrary keystrokes. Computer 106 will strip the arbitrary keys, and forward only the true password to computer 102 at step 206. If the password allows the user to access a particular application or other information, unsecured computer 104 is in effect logged into computer 102 by tunneling through the computer 106. It is worth emphasizing that computer 106 does not act as a password management system; i.e. the user's password is not stored on computer 106. In addition, since processing is done by computer 106, the interface provided by computer 102 does not need to be changed. In other words, there is no requirement or need to modify the interface of computer 102 in order to operate with computer 106. If needed, any information that needs to be conveyed between computer 104 and computer 102, can be presented to the user in a separate frame or window.

Figure 3:
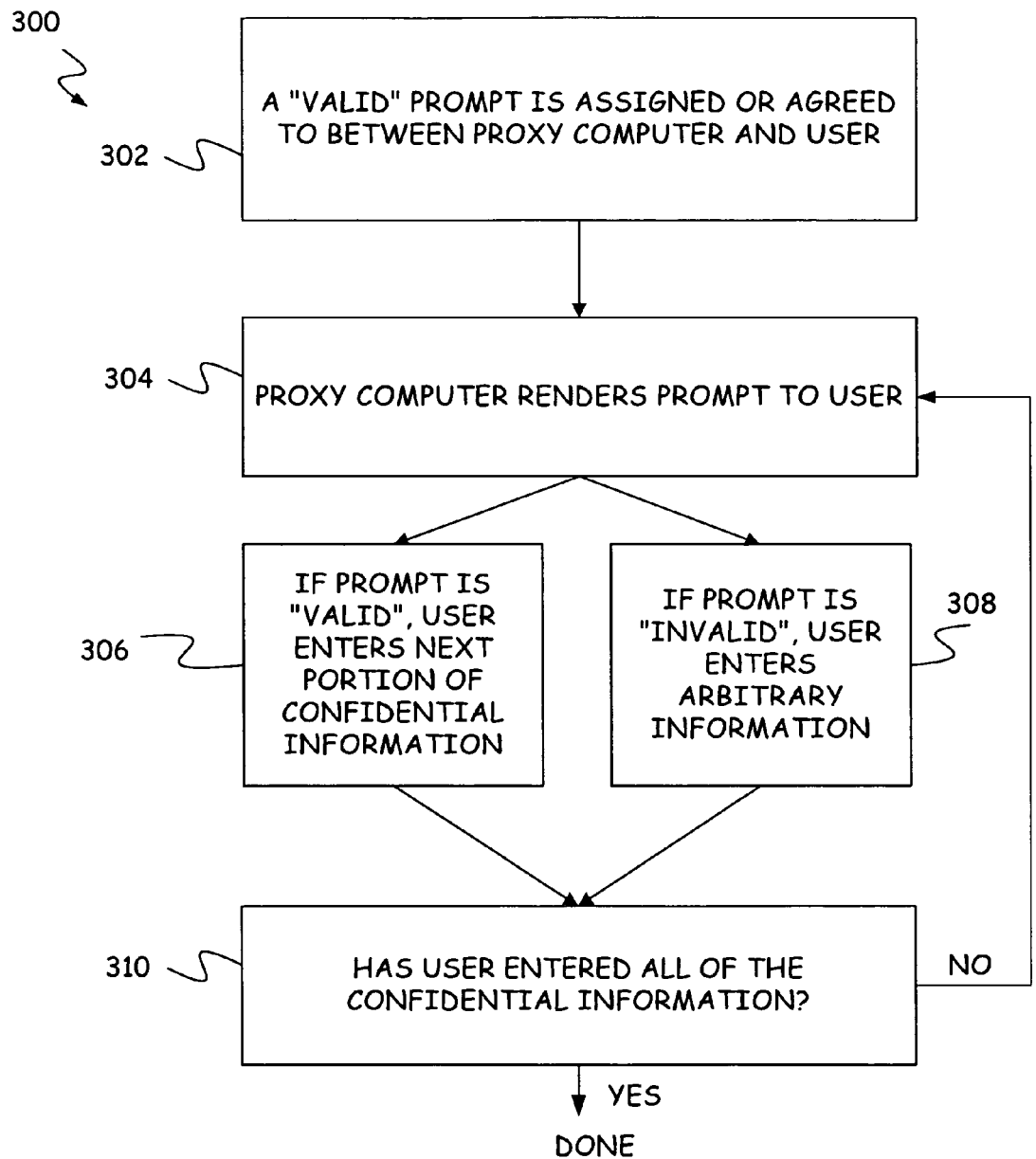
FIG. 3 is a second flow chart for entering confidential information.

FIG. 3 illustrates a method 300 for implementing step 202 in FIG. 2. At step 302, the form of a "valid" prompt (discussed below) is assigned or otherwise agreed to by the user. At step 304 computer 106 causes computer 104 to render a prompt (audible or visual) to the user. Generally, the "valid" prompt indicated by step 306 cues the user to respond with the next portion of the confidential information, or the first portion of the confidential information if none has been entered. In contrast, all other prompts ("invalid" prompts) indicated by step 308 cues the user to respond with an arbitrary input, i.e., not the next portion of the confidential information, or the first portion of the confidential information if none has been entered. Steps 304, 306 and 308 are repeated as necessary until all of the confidential information has been entered as indicated by step 310. Note that the invalid prompt need not be confined to just one form of invalid prompt, but rather can be any one of a plurality of invalid prompts. Security is provided because even if the user is being observed, or computer 104 includes a keylogger, valid and invalid prompts of the same format, and the user is providing a response to each prompt. Since the valid portions of the confidential information are being embedded in the noise of the arbitrary responses to the invalid prompts, a keylogger will record all response, but be unable to distinguish what portions are needed to construct the confidential information. In contrast, since computer 106 knows when valid and invalid prompts were rendered (based on the secret it shares with the user), once it receives all of the responses made by the user at step 206, it can easily ascertain those portions being part of the confidential information and those portions being arbitrary responses, and thereby, can construct confidential information in its entirety.

In one embodiment, by way of example, a valid prompt at step 302 could cue the user to depress a key on the keyboard for the next character of the confidential information, or the key for the first character if none has been entered. Similarly, an invalid prompt at step 304 could cue the user to depress an arbitrary key. However, this is but one exemplary form of input and it should be understood that the user's responses can be in the form of a mouse click on a certain part of the screen, a gesture or even an audible response.

Figure 4:
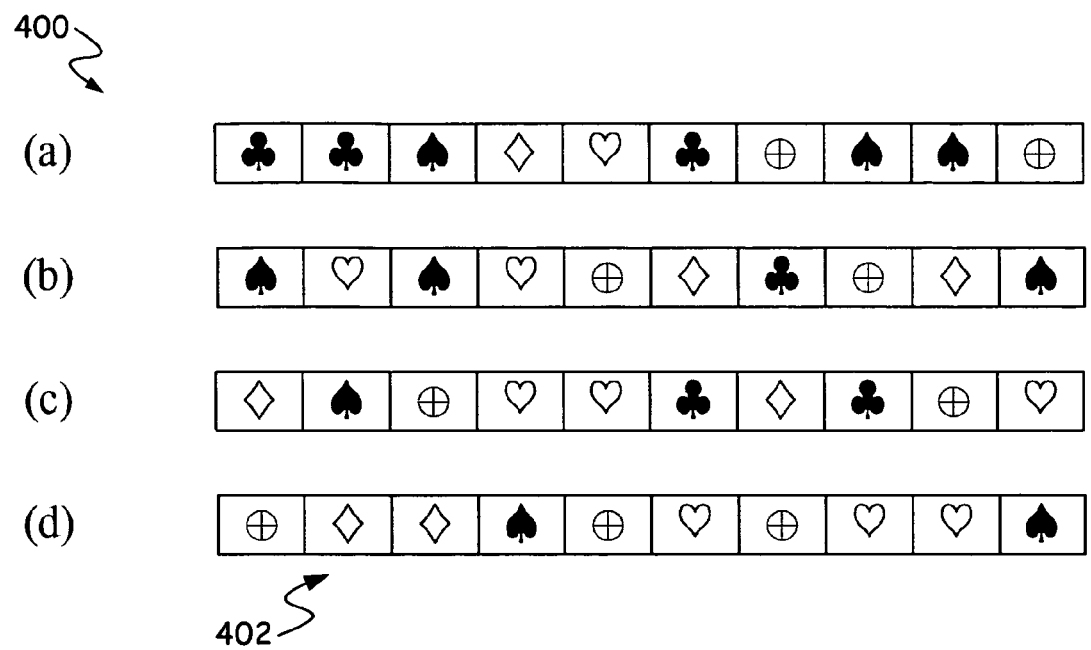
FIG. 4 is a pictorial representation of a prompt interface.

FIG. 4 is a pictorial representation of a prompt interface 400 further for prompting the user and generally conforming to the method described and illustrated in FIG. 3. In the embodiment illustrated, a plurality of prompting locations 402, each location, which is considered a prompting location, is capable of rendering two, but in many instances more than two, different symbols. In this manner, another level of complexity is providing for entering confidential information. Besides providing the user valid and invalid prompts to which the user responds with portions of the confidential information or arbitrary responses, respectively, as described above, the user will respond to the prompts provided at one of the designated prompt locations, known only to the user. In the one embodiment, the prompt locations are organized linearly such as in a row or column, or as in the embodiment illustrated in a plurality of rows, thereby forming a table. Nevertheless, this is but one embodiment and as appreciated by those skilled in the art other configurations, such as but not limited to a circle (e.g. clock face), triangle, etc. can be used. Instead of looking for a single symbol the user might look for a given sequences of symbols. Instead of looking in a single position the user might look in several different positions. In general a secret is shared between the user and computer 106 and this forms the basis from separating the confidential information and the arbitrary information.

Figure 5:
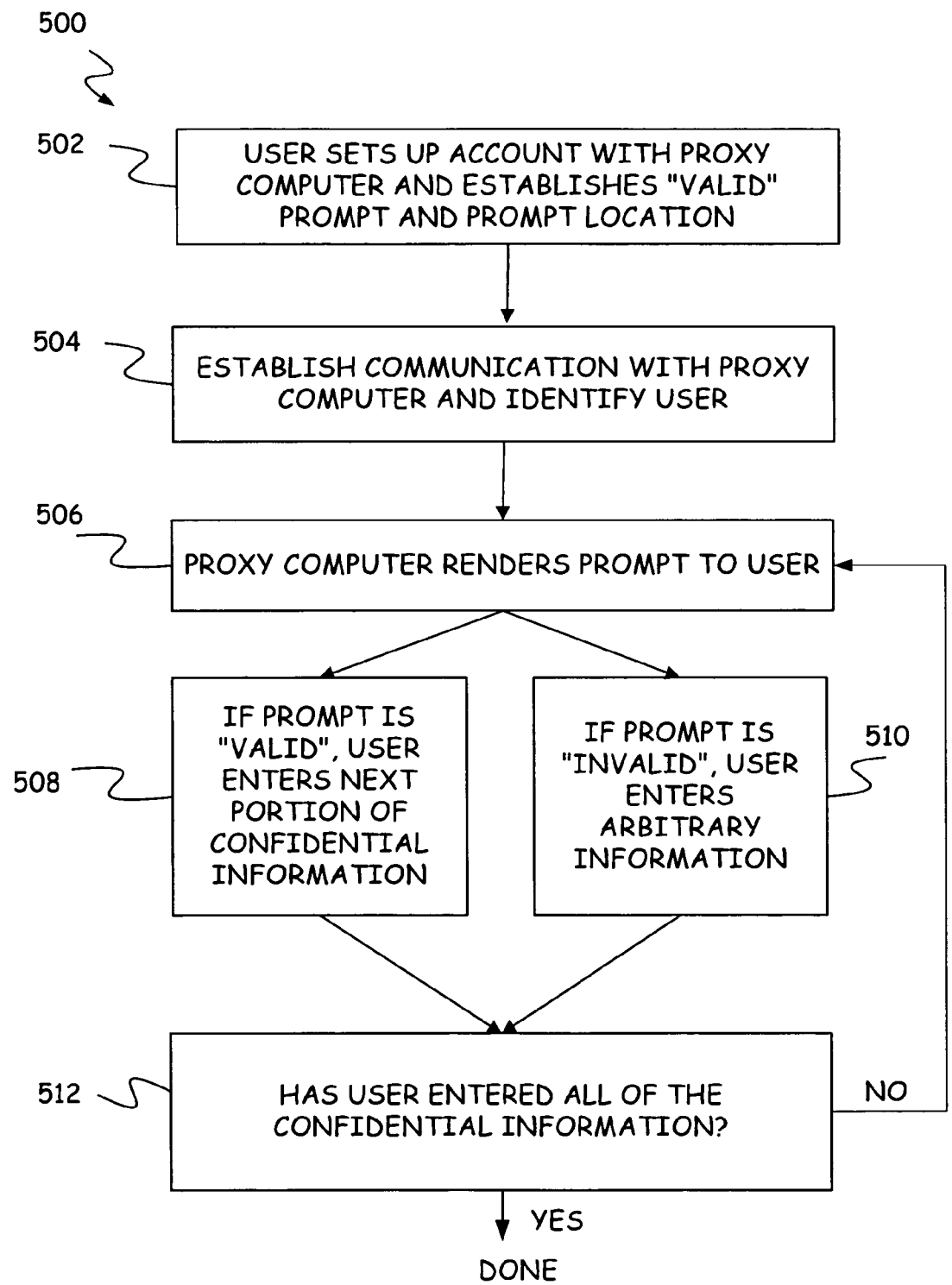
FIG. 5 is a flow chart for establishing an account with a computer and using the prompt interface of FIG. 4.

FIG. 5 is a flowchart of a method 500 for establishing an account with the computer 106 and using the prompt interface 400. At step 502, the user sets up an account with computer 106. During this step the user is assigned a symbol or other indication that will act as her valid prompt, and a position in prompt interface 400 where she will look for it. In a further embodiment, the user may enter URLs (universal resource locators) that correspond to the web sites that the user may want to access when using an unsecured computer. The user may also provide "usernames" or "user IDs" (user identifiers) for each of the entered URLs.

At this point, it should be noted that access to computer 106, for example, via the Internet, need not be password protected. After the user has established communication with computer 106 at step 504, the user can provide computer 106 with the registered username or user ID and the URL for the website or computer 102 to be accessed. With this information, the user should be uniquely identifiable if she has previously registered that domain and user ID pair with computer 106. However, it should be understood that this is but one embodiment and that other techniques for uniquely identify the user could also be used.

Once the user has been identified, computer 106 will then know which prompt location the user will be using for guidance on when to enter portions of the confidential information or arbitrary responses. At step 506, computer 106 provides a prompt to the user at the prompt location. Steps 508 and 510 are similar to steps 306 and 308, respectively, and determine whether the user is entering confidential information or arbitrary responses based on whether the correct symbol is at the designated prompt location to constitute a valid prompt. Steps 508 and 510 are repeated until the entire confidential information such as the password has been entered as indicated by step 512, where prompt interface 400 is refreshed every time a key is entered. When the user sees her assigned symbol in her assigned position she types the next key of her password; otherwise she types a random key. If a keylogger program is present on computer 104, it will not be able to discern which keys constitute the confidential information. Even if screen capture is used at every input that is entered it is not obvious which keys are which.

To further prevent detection as to which symbol and which position in the prompt interface prompts the user to enter a true portion of the confidential information, the statistics of the symbol changes can be examined. Assuming an average character length of confidential information is 8 characters long, and that an average of k random characters between successive keys is acceptable, then a total of (k+1)8 characters will be typed. The assigned symbol must appear in the assigned position 8 times. Any other symbol should appear a similar number of times over the course of the (k+1)8 characters. Hence, it may be beneficial to allow only $M=k+1$ distinct symbols to avoid compromising the scheme statistically.

Since the prompt location assigned to the user is unknown to a third party, there will be a total of N(k+1)possible passwords for the third party to check. Assuming an average of $k=4$ random characters between successive password keys is acceptable, and that a prompt interface of size $N=64$ is not too large, this provides 320 passwords that must be considered by the third party. Although the foregoing will hide or embed the confidential information in arbitrary characters, security is enhanced if an arbitrary password sequence such as "sr8bnz" is chosen over a password like "snoopy" because the likelihood of each of the characters following the preceding character in "sr8bnz" is less likely than that of "snoopy".

If no restriction is placed on the servers that can be contacted by using the proxy, there would be a simple attack to retrieve which symbol a particular user has been assigned. In particular, a natural line of attack is for a third party to set up a login server and capture a valid username or user ID. Using the valid username or user ID, the third party then would initiate communication with computer 106 and claim to be the user having the valid username or user ID, type in a series of keys and watch to see which are relayed from computer 106. This would be enough to reveal which symbol and position in the prompt interface were assigned to that user. To prevent this attack, the account registration of step 502 can include informing the server 106 of any "non-standard" sites the user may want to visit. By non-standard it is meant any sites not known to computer 106 to be reliable. Computer 106 will relay the associated confidential information (e.g. password) only to corresponding computer 102 or URL website. Since the user enumerates at registration in step 502, the usernames and associated websites or URLs she will be using, the third party attacker cannot induce computer 106 to relay any information for that username to any other domain and in particular, a domain setup by the third party.

A few other embodiments may be used for increased security. For example, instead of a single symbol, a sequence of symbols may be assigned to each user. Or more than one position where to look for a symbol can be assigned. In general any shared secret between the user and computer 106 can be used to extract the confidential information.

In another embodiment, the confidential information sent from computer 104 to computer 106 is hidden or mapped in an arbitrary mapping of the keys. Computer 106 then performs reverse key mapping to form the correct form of the confidential information that is then provided to computer 102.

In this approach, it is assumed a second communication path to the user exists, or has been previously created, which is used by the user to encrypt (map) the password. In particular, since confidential information such as passwords are usually short, a character-by-character encryption table can be used, where the user is asked to perform the mapping.

Figure 6:
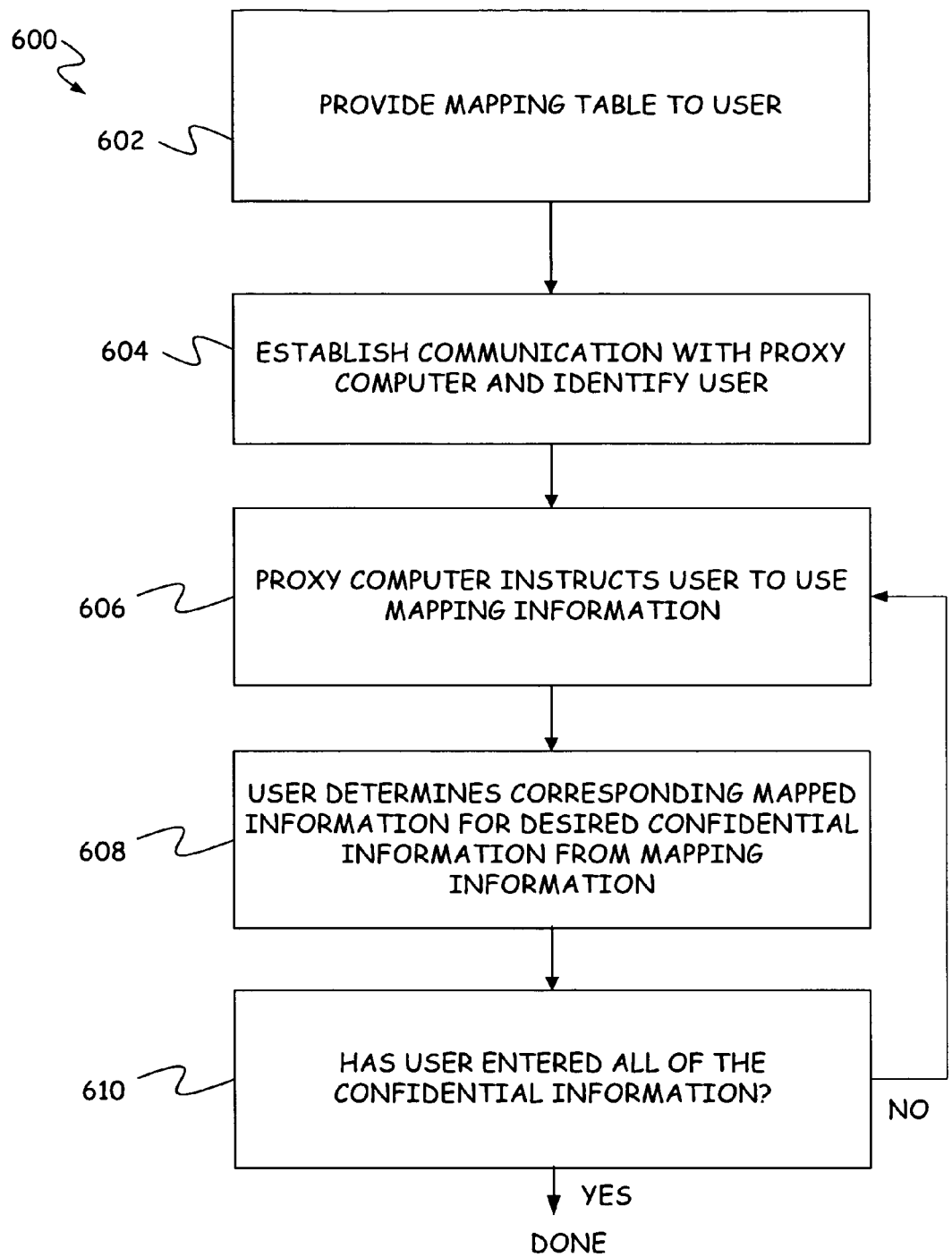
FIG. 6 is a flow chart illustrating a method for mapping confidential information.

FIG. 6 is a flow chart illustrating a method 600 for mapping the confidential information. At step 602, a mapping table such as illustrated in FIG. 7 at 700 is provided to the user. The form in which the mapping table is provided to the user can be as simple as a printout that the user physically carries, or an electronic form, for example, storable on a digital appliance such as a personal information manager (PIM), personal digital assistant (PDA), phone, etc. In one embodiment, for example, before a trip, the user goes to a website and asks for a mapping table 700. Each mapping table is arbitrary and a different mapping table can be generated for each user, and in a further embodiment, each time the user communicates with computer 106.

Computer 106 is made aware of the table, or the content of the table provided to the user. For instance, each table can have an identifier, which is associated with the user for at least one access attempt by the user, where computer 106 is provided with the table identifier associated with the user.

At step 604, the user communicates with computer 106 in a manner similar to that described above with respect to step 504. (As in method 500, method 600 can include a registration step similar to step 502). At step 604, the user provides the desired computer 102 or desired URL with the username.

Figure 8:
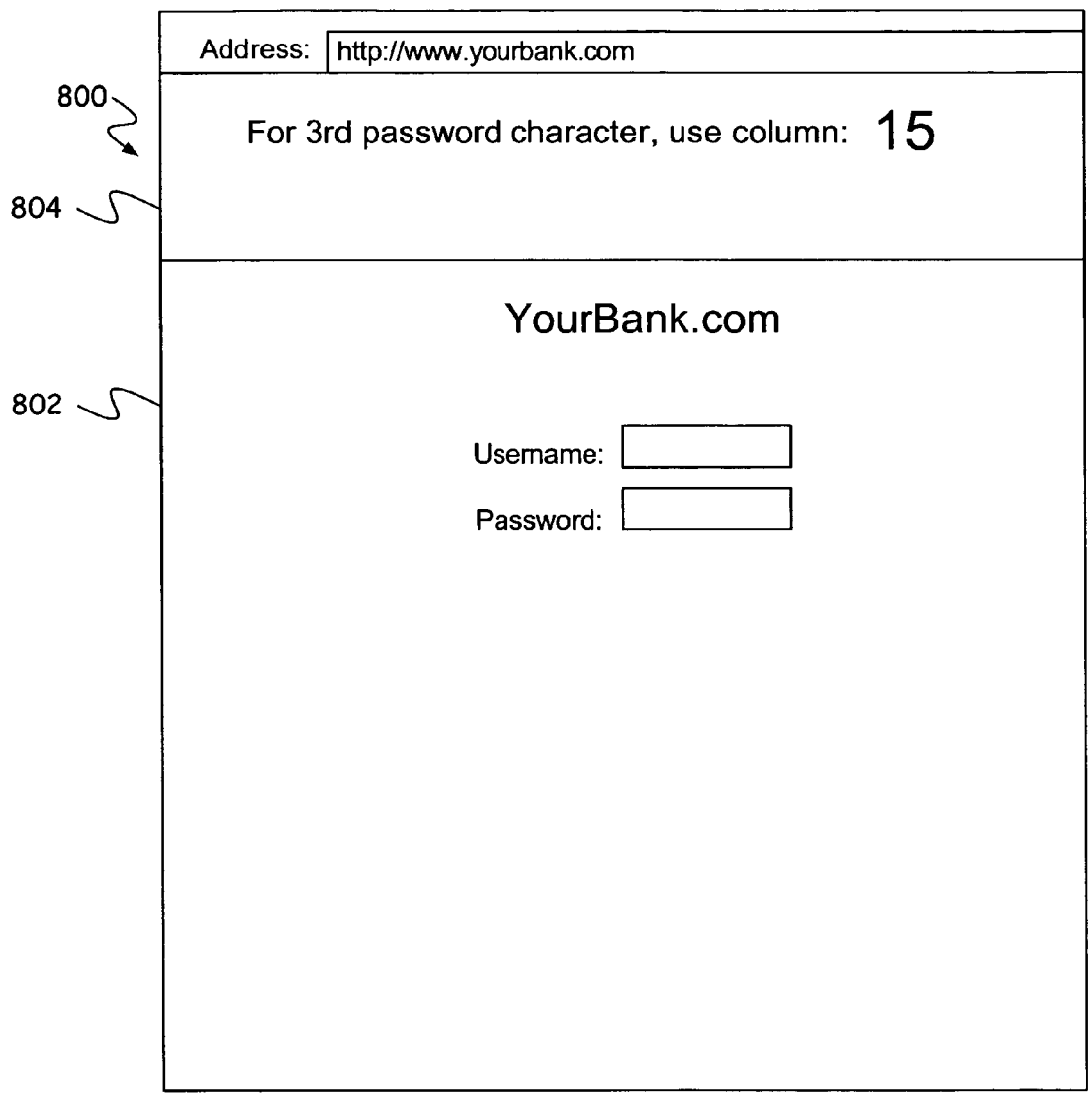
FIG. 8 is an exemplary user interface.

FIG. 8 shows an exemplary user interface 800 rendered by computer 106, upon identification of the user. In this embodiment, computer 106 renders a page of desired website in a first portion, herein, lower frame 802, while a second portion, herein, upper frame 804 is provided for prompting instructions. Again, this embodiment is merely illustrative, and in particular, a visual embodiment, where other forms of prompting and responses can be done audibly or with gestures.

At step 606, when computer 106 detects that the user intends to enter confidential information, for example, by clicking on a password field with a pointer from a mouse, the second portion 804 instructs the user on which column in the table 700 to use for entering the next password character(s). At step 608, the user will find the desired password character in column 702 and, staying in the same row, find the mapped character to enter from the column as instructed to use. Upon entry of the mapped character(s), and if more characters are required, steps 606 and 608 will be repeated as necessary until all of the confidential information has been entered as indicated by step 610. In one embodiment, each column in table 700 is preferably used only once to minimize detection of the confidential information; however, if necessary, column entries can be repeated such as using the same column for all of the characters of a particular password, or reusing the last entry as many times as required. Note that re-using the last column entry is simply a last-resort effort, but safety is compromised.

If the method of input requires the user to use a different column for each character, breaking the encryption is essentially impossible, since any key will be mapped to any key with same probability, because each column is independent. Only when columns are repeated such as when the last column is being used repeatedly (i.e., after the one time pad is exhausted, and until the user obtain a new one) there is any possibility of breaking the encryption. In this case, while the user is still safe from a direct decryption attack for many characters, other forms of attach may be possible. However, registration of the user with only valid URLs that the computer 106 is told to communicate with as discussed above offers protection against forwarding of confidential information to other addresses.

In a further embodiment, steps 602, 608 and 610 can be modified to provide further security and avoid the problem of having to obtain a new mapping table for each communication with computer 102 through computer 106. In this embodiment, mapping table 700 indirectly provides the mapping character by first providing an encryption key. FIG. 9 illustrates a mapping table 900 comprising a plurality of encryption keys, herein representative of columns in a second mapping table. In the embodiment illustrated, mapping table 900 represents 100 columns of the second mapping table, which can take the form similar to mapping table 700. The user can access the content of the mapping table 900, by printing it out or storing it in electronic form on a digital appliance (phone, PDA, PIM, etsc).

At step 608, computer 106 prompts the user with a location on the mapping table such as "C4". At step 610, the user obtains the encryption key at the prompted location and uses it as an identifier of the column to use for obtaining the mapped key to enter as the next character. The mapped table 700 is accessed by the user. Although the mapped table 700 could be printed out or otherwise carried by the user, in a more convenient embodiment, the mapped table 700 is rendered to the user under the control of computer 106. In this manner, the mapped table 700 can be changed as needed in order that a pattern can not be obtained. The only table needed to be carried or accessed by the user is table 900, which illustrated is smaller and thus more convenient, yet still provides numerous columns of mapped keys.

Figure 10:
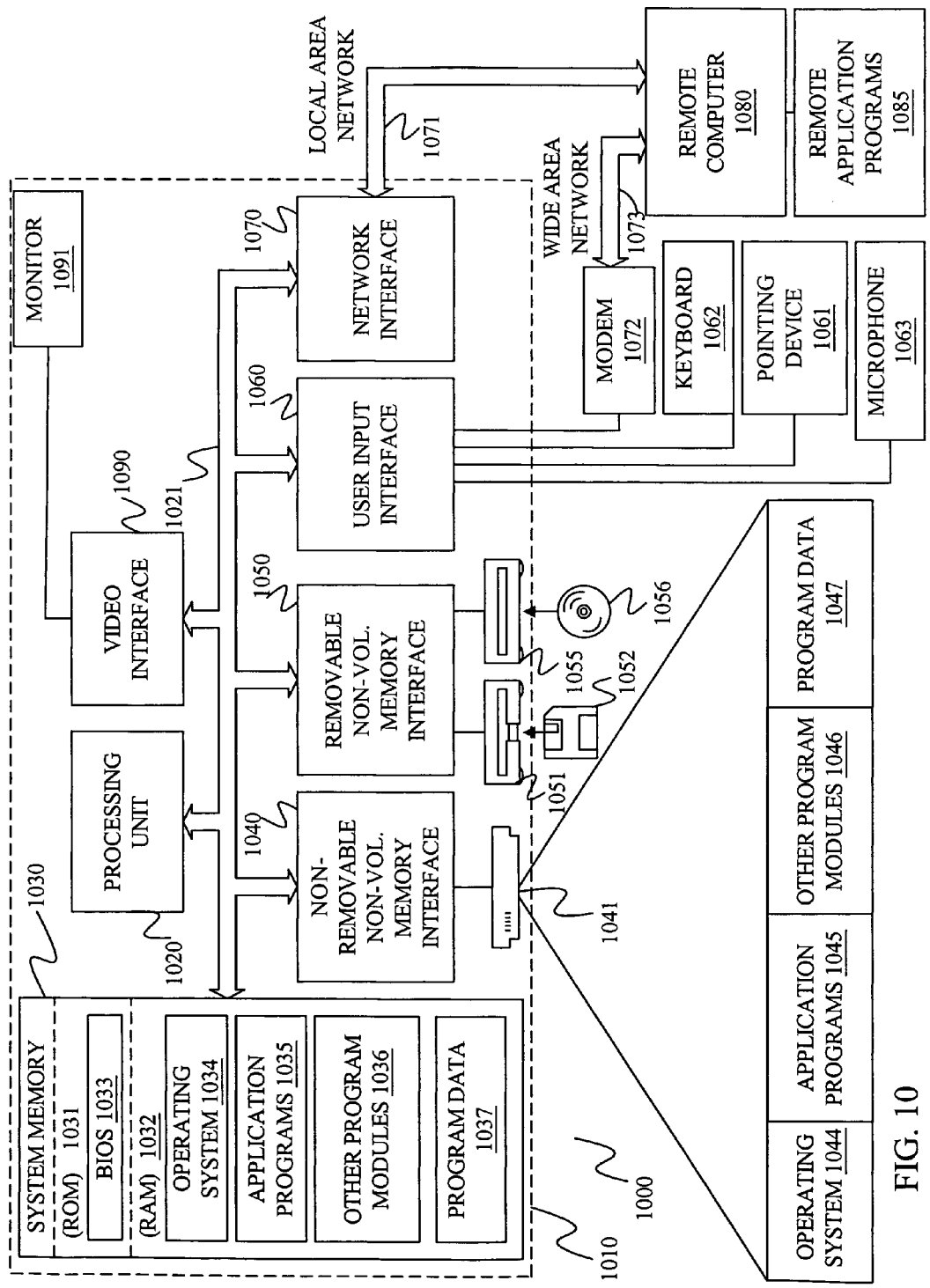
FIG. 10 is an exemplary computing environment.

FIG. 10 illustrates an example of a suitable computing system environment 1000 on which the concepts herein described may be implemented. In particular, a form of the computing system environment 1000 can be used for computer 102, computer 104 or computer 106. Nevertheless, the computing system environment 1000 is again only one example of a suitable computing environment for each of these computers and is not intended to suggest any limitation as to the scope of use or functionality of the description below. Neither should the computing environment 1000 be interpreted as having any dependency or requirement relating to any one or combination of components illustrated in the exemplary operating environment 1000.

In addition to the examples herein provided, other well known computing systems, environments, and/or configurations may be suitable for use with concepts herein described. Such systems include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The concepts herein described may be embodied in the general context of computer-executable instructions, such as program modules, being executed by a computer. Generally, program modules include routines, programs, objects, components, data structures, etc. that perform particular tasks or implement particular abstract data types. Those skilled in the art can implement the description and/or figures herein as computer-executable instructions, which can be embodied on any form of computer readable media discussed below.

The concepts herein described may also be practiced in distributed computing environments where tasks are performed by remote processing devices that are linked through a communications network. In a distributed computing environment, program modules may be located in both locale and remote computer storage media including memory storage devices.

With reference to FIG. 10, an exemplary system includes a general purpose computing device in the form of a computer 1010. Components of computer 1010 may include, but are not limited to, a processing unit 1020, a system memory 1030, and a system bus 1021 that couples various system components including the system memory to the processing unit 1020. The system bus 1021 may be any of several types of bus structures including a memory bus or memory controller, a peripheral bus, and a locale bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) locale bus, and Peripheral Component Interconnect (PCI) bus also known as Mezzanine bus.

Computer 1010 typically includes a variety of computer readable media. Computer readable media can be any available media that can be accessed by computer 1010 and includes both volatile and nonvolatile media, removable and non-removable media. By way of example, and not limitation, computer readable media may comprise computer storage media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 1000.

The system memory 1030 includes computer storage media in the form of volatile and/or nonvolatile memory such as read only memory (ROM) 1031 and random access memory (RAM) 1032. A basic input/output system 1033 (BIOS), containing the basic routines that help to transfer information between elements within computer 1010, such as during start-up, is typically stored in ROM 1031. RAM 1032 typically contains data and/or program modules that are immediately accessible to and/or presently being operated on by processing unit 1020.

FIG. 10 illustrates operating system 1034, application programs 1035, other program modules 1036, and program data 1037. Herein, the application programs 1035, program modules 1036 and program data 1037 implement one or more of the concepts described above.

The computer 1010 may also include other removable/non-removable volatile/nonvolatile computer storage media. By way of example only, FIG. 10 illustrates a hard disk drive 1041 that reads from or writes to non-removable, nonvolatile magnetic media, a magnetic disk drive 1051 that reads from or writes to a removable, nonvolatile magnetic disk 1052, and an optical disk drive 1055 that reads from or writes to a removable, nonvolatile optical disk 1056 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 1041 is typically connected to the system bus 1021 through a non-removable memory interface such as interface 1040, and magnetic disk drive 1051 and optical disk drive 1055 are typically connected to the system bus 1021 by a removable memory interface, such as interface 1050.

The drives and their associated computer storage media discussed above and illustrated in FIG. 10, provide storage of computer readable instructions, data structures, program modules and other data for the computer 1010. In FIG. 10, for example, hard disk drive 1041 is illustrated as storing operating system 1044, application programs 1045, other program modules 1046, and program data 1047. Note that these components can either be the same as or different from operating system 1034, application programs 1035, other program modules 1036, and program data 1037. Operating system 1044, application programs 1045, other program modules 1046, and program data 1047 are given different numbers here to illustrate that, at a minimum, they are different copies.

A user may enter commands and information into the computer 1010 through input devices such as a keyboard 1062, a microphone 1063, and a pointing device 1061, such as a mouse, trackball or touch pad. These and other input devices are often connected to the processing unit 1020 through a user input interface 1060 that is coupled to the system bus, but may be connected by other interface and bus structures, such as a parallel port or a universal serial bus (USB). A monitor 1091 or other type of display device is also connected to the system bus 1021 via an interface, such as a video interface 1090.

The computer 1010 may operate in a networked environment using logical connections to one or more remote computers, such as a remote computer 1080. The remote computer 1080 may be a personal computer, a hand-held device, a server, a router, a network PC, a peer device or other common network node, and typically includes many or all of the elements described above relative to the computer 1010. The logical connections depicted in FIG. 10 include a locale area network (LAN) 1071 and a wide area network (WAN) 1073, but may also include other networks. Such networking environments are commonplace in offices, enterprise-wide computer networks, intranets and the Internet.

When used in a LAN networking environment, the computer 1010 is connected to the LAN 1071 through a network interface or adapter 1070. When used in a WAN networking environment, the computer 1010 typically includes a modem 1072 or other means for establishing communications over the WAN 1073, such as the Internet. The modem 1072, which may be internal or external, may be connected to the system bus 1021 via the user-input interface 1060, or other appropriate mechanism. In a networked environment, program modules depicted relative to the computer 1010, or portions thereof, may be stored in the remote memory storage device. By way of example, and not limitation, FIG. 10 illustrates remote application programs 1085 as residing on remote computer 1080. It will be appreciated that the network connections shown are exemplary and other means of establishing a communications link between the computers may be used.

It should be noted that the concepts herein described can be carried out on a computer system such as that described with respect to FIG. 10. However, other suitable systems include a server, a computer devoted to message handling, or on a distributed system in which different portions of the concepts are carried out on different parts of the distributed computing system.

Although the subject matter has been described in language specific to structural features and/or methodological acts, it is to be understood that the subject matter defined in the appended claims is not limited to the specific features or acts described above as has been held by the courts. Rather, the specific features and acts described above are disclosed as example forms of implementing the claims.

What is claimed is:

1. A computer-implemented method of transferring confidential information through a network, the method comprising: initiating that a set of prompts including prompt information are rendered to a user, without rendering a selected secret that is known to the user, to selectively input a set of user input comprising portions of the confidential information and arbitrary information in a sequence that alternates at least in part between portions of the confidential information and the arbitrary information, such that input of the confidential information is divided by input of the arbitrary information according to the sequence, the sequence of the portions of the confidential information and the arbitrary information being based at least in part on the selected secret, the selected secret being information that is different from the confidential information and identifies that a given prompt in the set of prompts receives a portion of confidential information in the sequence rather than a portion of arbitrary information, the prompt information informing only a user who knows the selected secret when to input the portions of confidential information within the set of prompts and when to input the arbitrary information within the set of prompts, wherein the prompt information distinguishes the portions of confidential information from the portions of arbitrary information to only a user who knows the selected secret;

receiving and processing the set of user input, using one or more processors, having access to the selected secret and comparing the set of user input with the set of prompts and with the selected secret so as to separate the arbitrary information from the portions of the confidential information, thereby ascertaining the confidential information, and wherein without using the information of the selected secret, the confidential information cannot be ascertained from the sequence of portions of the confidential information and the arbitrary information; and transmitting the ascertained confidential information.

2. The computer-implemented method of claim 1 wherein the prompts comprise valid prompts cueing the user to enter a portion of the confidential information, and invalid prompts cueing the user to enter arbitrary information, wherein initiating includes initiating that the valid and invalid prompts are at least in part rendered alternately.

3. The computer-implemented method of claim 2 wherein the invalid prompts comprise a plurality of different invalid prompts.

4. The computer-implemented method of claim 3, wherein initiating comprises initiating that the set of prompts are rendered to the user at a first computer, the set of user input received and processed at a second computer that comprises the one or more processors and communicates with the first computer over the network, and the ascertained confidential information is transmitted from the second computer to a third computer.

5. The computer-implemented method of claim 4, wherein the prompts comprise a prompt interface having a plurality of possible prompt locations, and wherein the method further includes establishing between the user and the second computer which of the plurality of possible prompt locations will be used to distinguish a valid prompt from an invalid prompt.

6. The computer-implemented method of claim 5 and further comprising providing user information at the second computer so as to identify the user when a communication is made between the first computer and the second computer.

7. The computer-implemented method of claim 6 wherein the user information includes a URL address of a site to which the user desires access, and wherein the method further includes forwarding the confidential information to the URL address.

8. The computer-implemented method of claim 1 and further comprising receiving information that identifies the user, and identifying the selected secret based on the identification of the user.

9. A computer-implemented method of transferring confidential information through a network, the method comprising:

identifying a mapping table that is known to the user, the mapping table having at least one row that indicates a mapping of information into an encryption code;

initiating that a set of prompts including prompt information are rendered to a user, without rendering the mapping table, that indicate to a user to selectively input portions of the confidential information by inputting mapped information, instead of the confidential information itself, wherein the mapped information corresponds to the user directly using the mapping table based on prompt information from the set of prompts, the prompt information identifying at least one of a row and column of the mapping table to ascertain an encrypted form of the confidential information based on the mapping of information into the encryption code indicated by the mapping table; receiving and processing the encrypted form of the confidential information, using one or more processors having access to the mapping table and comparing the encrypted form of the confidential information with the set of prompts and with the mapping table, thereby decoding the encrypted form of the confidential information so as to ascertain the confidential information, wherein without using the mapping of information indicated by the mapping table, the confidential information cannot be ascertained from the encrypted form; and transmitting the confidential information.

10. The computer-implemented method of claim 9 wherein the mapping table includes a plurality of columns, each column having arbitrary characters associated with characters forming portions of the confidential information, and wherein indicating to the user to selectively input portions of the confidential information includes indicating which column to use.

11. The computer-implemented method of claim 10 wherein indicating to the user to selectively input portions of the confidential information includes indicating a plurality of columns to use to input all of the confidential information.

12. The computer-implemented method of claim 11 wherein indicating to the user to selectively input portions of the confidential information includes indicating a different column for each portion of confidential information to be inputted.

13. The computer-implemented method of claim 12 wherein initiating comprises initiating that the set of prompts are rendered to the user at a first computer, the encrypted form of the confidential information is received and processed at a second computer that comprises the one or more processors and communicates with the first computer over the network, and the confidential information is transmitted from the second computer to a third computer, and further comprising providing user information at the second computer so as to identify the user when a communication is made between the first computer and the second computer.

14. The computer-implemented method of claim 13 wherein the user information includes a URL address of a site to which the user desires access, and wherein the method further includes forwarding the confidential information to the URL address.

15. The computer-implemented method of claim 9 wherein the first-mentioned mapping table provides an indication to use a portion of a second mapping table, and wherein the indicating to the user to selectively input portions of the confidential information is based on the first-mentioned mapping table and the second mapping table.

16. The computer-implemented method of claim 15 wherein the second mapping table includes a plurality of columns, each column having arbitrary characters associated with characters forming portions of the confidential information, and wherein indicating to the user to selectively input portions of the confidential information includes indicating which column to use, and wherein indicating to the user to selectively input portions of the confidential information includes indicating to the user which column to use of the second mapping table via the indication provided for the first-mentioned table.

17. The computer-implemented method of claim 16 wherein the second mapping table is rendered to the user, and wherein indicating to the user to selectively input portions of the confidential information includes indicating a different column of the second mapping table for each portion of confidential information to be inputted.

18. The computer-implemented method of claim 9 in which the mapping table indicates a character-by-character encryption code.

19. A computer-implemented method of transferring confidential information from a first computer to a second computer through a network, the method comprising: initiating that a set of prompts are to be rendered via one or more user output components of the first computer, that a user is to selectively input, to the first computer, a set of user input comprising portions of the confidential information and arbitrary information in a sequence that alternates at least in part between portions of the confidential information and the arbitrary information, such that input of the confidential information is divided by input of the arbitrary information according to the sequence, the sequence of the portions of the confidential information and the arbitrary information being based at least in part on a selected secret, the selected secret being information that is different from the confidential information, and being known to the user, the set of prompts rendering prompt information that informs only a user who knows the selected secret when to input the portions of confidential information and when to input the arbitrary information, the set of prompts rendering the prompt information without rendering the selected secret itself, and wherein the arbitrary information is distinguished from the confidential information in that the arbitrary information has no relevance to the user at its time of entry; receiving and processing the set of user input at a third computer in communication with the first computer, using one or more processors comprised in the third computer, in which the third computer has access to the selected secret and compares the set of user input with the set of prompts and with the selected secret so as to separate the arbitrary information from the portions of the confidential information, thereby ascertaining the confidential information, and wherein without using the information of the selected secret, the confidential information cannot be ascertained from the sequence of portions of the confidential information and the arbitrary information; and forwarding the ascertained confidential information from the third computer to the second computer.

20. The computer-implemented method of claim 1, wherein the arbitrary information is distinguished from the confidential information in that the arbitrary information has no relevance to the user at its time of entry.

* * * * *